(12) United States Patent
Bickford et al.

(10) Patent No.: US 9,058,250 B2
(45) Date of Patent: Jun. 16, 2015

(54) IN-SITU COMPUTING SYSTEM FAILURE AVOIDANCE

(71) Applicant: International Business Machines Corporation, Armonk, NY (US)

(72) Inventors: Jeanne P. S. Bickford, Essex Junction, VT (US); Nazmul Habib, South Burlington, VT (US); Baozhen Li, South Burlington, VT (US); Pascal A. Nsame, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 13/948,811

(22) Filed: Jul. 23, 2013

(65) Prior Publication Data
US 2015/0033081 A1    Jan. 29, 2015

(51) Int. Cl.
*G06F 11/00* (2006.01)
*G06F 11/30* (2006.01)

(52) U.S. Cl.
CPC .......... *G06F 11/004* (2013.01); *G06F 11/3065* (2013.01); *G06F 11/30* (2013.01)

(58) Field of Classification Search
CPC .................................................. G06F 11/3065
USPC .................. 714/39, 47.1, 47.2, 47.3, 48, 1, 2
See application file for complete search history.

(56) References Cited

U.S. PATENT DOCUMENTS

| | | | |
|---|---|---|---|
| 6,301,970 B1 | 10/2001 | Biggs et al. | |
| 7,107,491 B2 * | 9/2006 | Graichen et al. | 714/37 |
| 7,146,292 B2 | 12/2006 | Rossi et al. | |
| 7,184,932 B1 * | 2/2007 | Lopez et al. | 702/185 |
| 7,567,891 B1 | 7/2009 | Liu et al. | |
| 7,710,131 B1 | 5/2010 | Tiernan | |
| 7,835,890 B2 | 11/2010 | Wu et al. | |
| 8,103,463 B2 * | 1/2012 | Kalgren et al. | 702/57 |
| 8,127,157 B2 | 2/2012 | Bilak | |
| 8,201,038 B2 | 6/2012 | Graas et al. | |
| 8,260,708 B2 | 9/2012 | Potkonjak | |
| 2002/0019870 A1 | 2/2002 | Chirashnya | |
| 2003/0057971 A1 | 3/2003 | Nishiyama et al. | |
| 2004/0078634 A1 | 4/2004 | Gilstrap | |
| 2004/0153679 A1 * | 8/2004 | Fitton et al. | 713/322 |
| 2007/0088974 A1 | 4/2007 | Chandwani | |
| 2008/0086708 A1 | 4/2008 | Rittman | |
| 2008/0140362 A1 | 6/2008 | Gross | |
| 2009/0076790 A1 | 3/2009 | Fein | |

(Continued)

OTHER PUBLICATIONS

We et al., "Interconnect Lifetime Prediction for Reliability-Aware Systems", IEEE Transactions on Very Large Scale Integration (VLSI) Systems, vol. 15, No. 2, Feb. 2007, pp. 159-172.

(Continued)

*Primary Examiner* — Dieu-Minh Le
(74) *Attorney, Agent, or Firm* — David Cain; Hoffman Warnick LLC

(57) ABSTRACT

A remaining time to replace can be updated taking into account time variation of a failure mechanism of a device. Starting with an initial remaining time to replace, an effective operating time can be determined periodically based on an operating parameter measured at a tracking interval, and remaining time to replace can be updated by subtracting the effective operating time. The technique can be applied to multiple failure mechanisms and to multiple devices and/or components each having multiple failure mechanisms.

20 Claims, 11 Drawing Sheets

(56) References Cited

U.S. PATENT DOCUMENTS

2011/0231697 A1* 9/2011 Berke et al. .................. 714/3
2012/0123745 A1  5/2012 Sheu et al.
2013/0090900 A1  4/2013 Gering

OTHER PUBLICATIONS

Lu et al., "Interconnect Lifetime Prediction under Dynamic Stress for Reliability-Aware Design", IEEE, 2004, pp. 327-334.
Lu et al., "Improved Thermal Management with Reliability Banking", IEEE Computer Society, 2005, pp. 40-49.
Srinivasan et al., "The Case for Lifetime Reliability-Aware Microprocessors", Proceedings of the 31st Annual International Symposium on Computer Architecture (ISCA '04), 2004, 12 pages.
Libby, "Effective HPC hardware management and Failure prediction strategy using IPMI", Proceedings of the Linux Symposium, 2003.
JEDEC Solid State Technology Association, "Failure Mechanism and Models for Semiconductor Devices", Oct. 2011.
Vigrass, "Calculation of Semiconductor Failure Rates".
Loughmiller, "Quality and Reliability of Semiconductor Devices", Micron Group, Inc.
Sony, "Semiconductor Device Reliability Verification", Semiconductor Quality and Reliability Handbook.

* cited by examiner

IN-SITU COMPUTING SYSTEM FAILURE AVOIDANCE

BACKGROUND

The invention relates generally to semiconductor devices and systems using such devices, particularly to improving failure rate and estimates of remaining component life.

Computing systems and components thereof are typically designed for a specific number of power on hours (POH) over their useful life, which can be referred to as the component's and/or system's design life. This design life can then be used to estimate the component and/or system reliability, such that elapse of a particular number of POH can be specified as a flag for replacement of the item. Current reliability estimation uses one temperature, such as a spec, design, and/or or nominal operating temperature of a component, device, and/or system product, at the time of design to estimate a "Time to Fail" of the system. However, actual operating temperatures can vary significantly during operation of a computing system, which can alter an actual time to failure of the system. As a result, some field actions are taken prematurely, while others are not taken soon enough, which can result in a reduction in operating capacity of the computing system or even cessation of operation.

SUMMARY

Embodiments of the invention disclosed herein can take the form of a computing system failure avoidance method identifying at least one failure mechanism of each device affected by time variation of an operating parameter of the device and assigning a respective time to replace for each failure mechanism. A respective remaining time to replace can be assigned, initially equal to the respective time to replace for each failure mechanism, and the operating parameter can be tracked periodically at a tracking interval. A respective remaining time to replace for each failure mechanism can also be tracked periodically at the tracking interval, and can include determining an effective operating time of the respective device during each tracking interval based on at least one value of the operating parameter tracked during a respective tracking interval, and subtracting the effective operating time from the respective remaining time to replace. A respective device can be replaced responsive to one of the respective estimated time to replace reaching a respective threshold value.

Other embodiments of the invention disclosed herein can take the form of an in-situ computing system failure avoidance method including assigning a respective time to replace for each device of the at least one device, assigning a respective remaining time to replace initially equal to the respective time to replace, and tracking at least one operating parameter of each device, including measuring an operating parameter of the device at least once for each device during a tracking interval. A respective effective operation time can be determined for each device based on a respective measured value of the operating parameter and the tracking interval, and the respective effective operation time can be subtracted from the respective remaining time to replace. In addition, the method can include monitoring for a failure of the at least one device, and, responsive to a failure of the at least one device, maintaining the respective device and continuing operation in response to the failure being recoverable, and notifying a user in response to the failure not being recoverable. Responsive to a respective remaining time to replace having reached a threshold value, the respective device can be replaced.

Further, embodiments of the invention disclosed herein can take the form of a computing system failure avoidance computer program product for a computing system including at least one device and at least one processing unit in communication with at least one non-transitory computer readable storage medium, the computer program product being stored on the at least one non-transitory computer readable storage medium and including instructions in the form of computer executable code. When loaded and executed by the processing unit, the instructions can cause the processing unit to perform a method including identifying at least one failure mechanism of each of the at least one device affected by time variation of an operating parameter of the respective device, assigning a respective time to replace for each failure mechanism, and assigning a respective remaining time to replace for each failure mechanism initially equal to the respective time to replace. The operating parameter can be tracked periodically at a tracking interval, and the respective remaining time to replace can be tracked for each failure mechanism. Tracking the respective time to replace can include determining an effective operating time of each device during each tracking interval based on at least one value of the operating parameter tracked during a respective tracking interval, and subtracting the effective operating time from the respective remaining time to replace. A respective device can be replaced in response to one of the respective remaining time to replace reaching a respective threshold value.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings.

DETAILED DESCRIPTION

Figure 1:
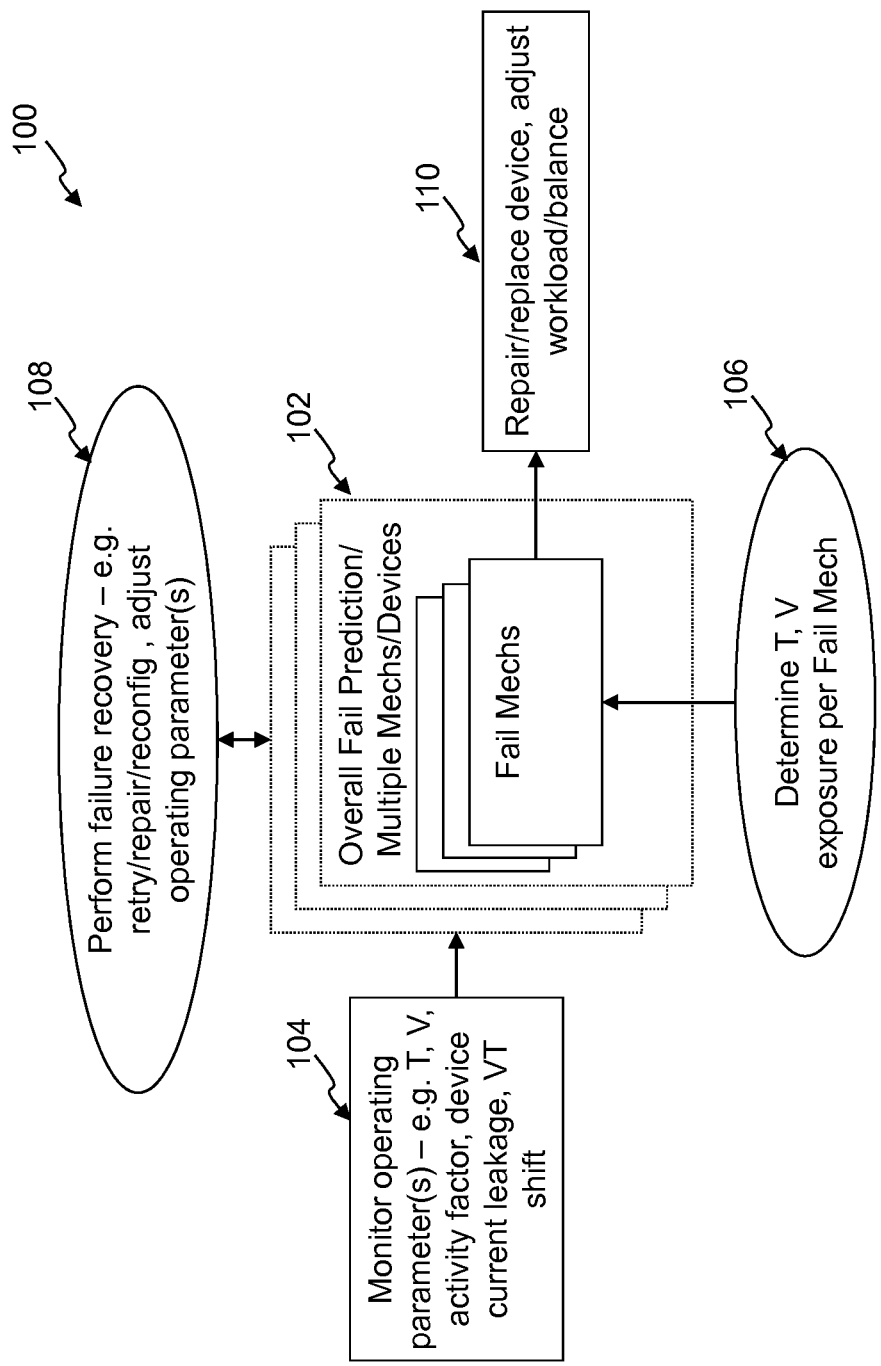
FIG. 1 is a schematic block diagram of a failure avoidance method and/or system according to embodiments of the invention disclosed herein.

Because of time-variation of temperature, voltage, and other operating parameters, such as those listed in FIG. 1, of a computing system, one or more failure mechanisms of a device of the computing system can be accelerated, causing a failure of the device before conventional methods would predict a failure or a time to replace the device. This is illustrated, for example, in FIG. 2, which shows remaining time to fail or "fail budget" vs. system operating time for various conditions. The solid line represents a typical curve obtained using a design or nominal operating temperature of a device of a computing system. To account for variations, a failsafe or safety window is typically employed, so that at a threshold value of operating time that is before an estimated time to actual failure, the device in question can be replaced. However, if the actual effective operating temperature winds up being lower than design or nominal ($T_{eff}<T_{des}$), failure can occur later, as illustrated by the upper dashed line in FIG. 2, and can fall significantly beyond the failsafe window. This can result in premature replacement of the device. But if instead the operating temperature is higher than design ($T_{eff}>T_{des}$), as illustrated by the lower dashed line, failure can occur sooner, in some cases far sooner, than estimated based on design operating temperature, which can result in failure of the device and reduction in capacity of the computing system. It should be noted that "time of operation," "operation time," and "operating time" may be used interchangeably herein.

Embodiments of the invention disclosed herein, therefore, take into account real time operating parameters of a computing system to determine effective operating time of each device of the computing system. Starting with a remaining time to replace set to a nominal time to replace for each failure mechanism of each device, the effective operating time can be used to update the remaining time to replace for each failure mechanism of each device. This is illustrated schematically in FIG. 1, in which an in-situ computing system failure avoidance method and/or system 100 can monitor one or more operating parameters (block 102) and to determine effective operating time and/or exposure of each device to the one or more operating parameters (block 104). These values can then be used to determine, estimate, and/or adjust time(s) to replace for one or more failure mechanisms of each device (block 106). In the event of a failure of a device, a failure recovery process or action can be performed (block 108), such as retrying an instruction, repairing a bitcell and/or bitline, reconfiguring the computing system to shift load away from the affected device, and/or adjusting operating parameters, among other things. If the failure isn't recoverable, a failure recovery is not successful, and/or no failure has occurred but a remaining time to replace of a device has passed a threshold value, then the device can be replaced and/or repaired (block 110). In addition, workload can be adjusted balance aging of a plurality of devices, to age one or more devices faster or slower than others, and/or to achieve other goals as may be desired and/or suitable (block 110). For example, if two devices are cores of a multicore processing chip and one core has a remaining time to replace that is less than the other, workload can be shifted to the core with higher remaining time to replace so that the two cores can have more synchronized aging. This can avoid replacing a chip with a core that has significant life left and/or can extend the effective life of the chip.

Figure 2:
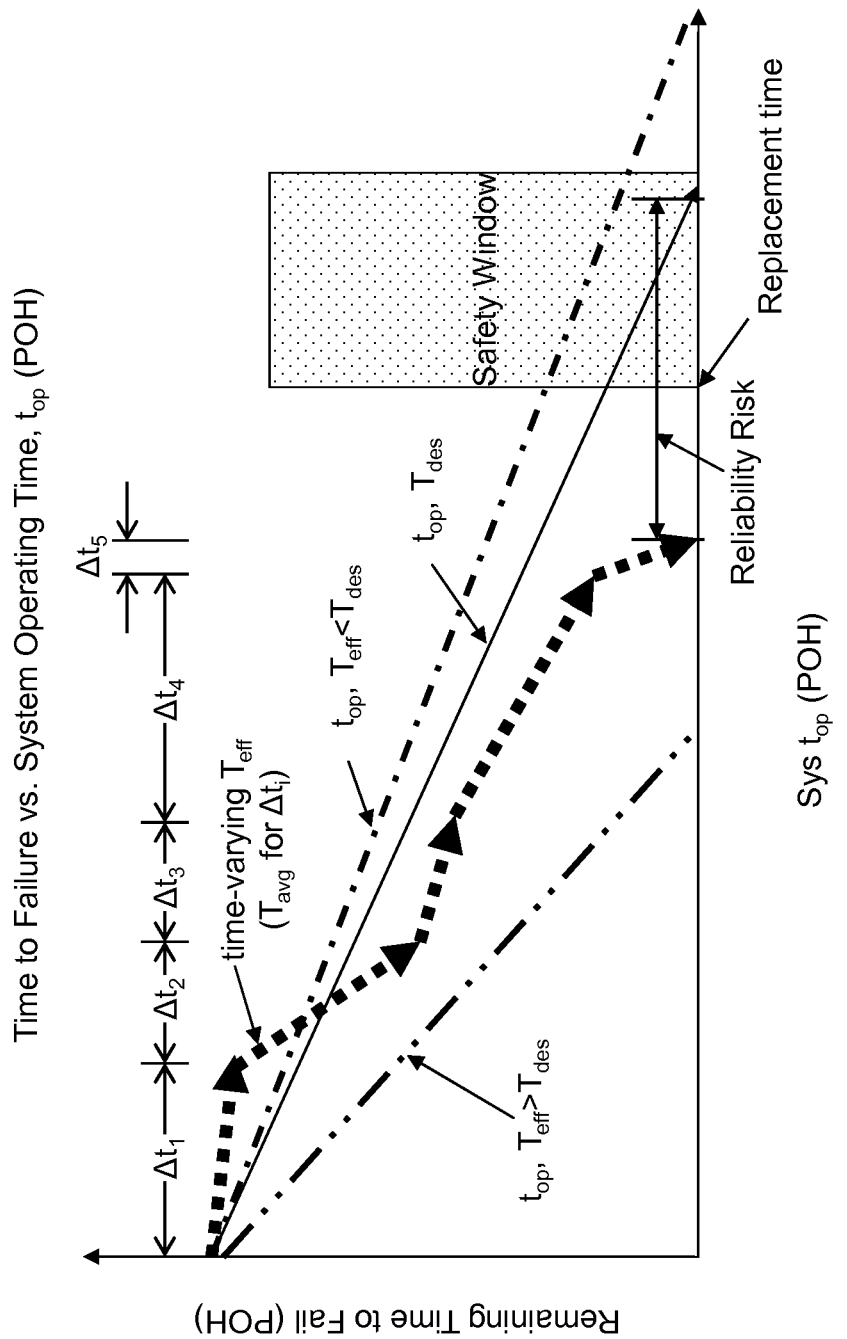
FIG. 2 is an illustrative plot of remaining time to fail versus operating time or time of operation showing an application of a failure avoidance method and/or system according to embodiments of the invention disclosed herein.

The above general description of embodiments is illustrated in FIG. 2 by the line including a series of arrows. Each arrow can represent an interval $\Delta t_i$ during which and/or after which the operating parameter(s) can be measured. Effective operating time for each device during each interval $\Delta t_i$ can be determined, and a remaining time to replace can be updated by subtracting the effective operating time at each interval. By tracking remaining time to failure according to embodiments, and by adjusting a time to replace accordingly, premature and/or tardy device replacements can be avoided, saving cost and effort as well as avoiding down time of the computing system. For example, in the first interval $\Delta t_1$ illustrated, the device aged more slowly than estimated using typical techniques as a result of operating at a lower temperature than design ($T_{avg}<T_{des}$), but in the next interval $\Delta t_i$, aging accelerated due to operating at a higher temperature than design ($T_{avg}>T_{des}$), and so forth. This can result in a time to failure that can be shorter than that estimated using design temperature, but by updating the remaining time to replace at each interval, the device can be replaced before it fails, even though the factory time to replace has not yet elapsed.

Figure 3:
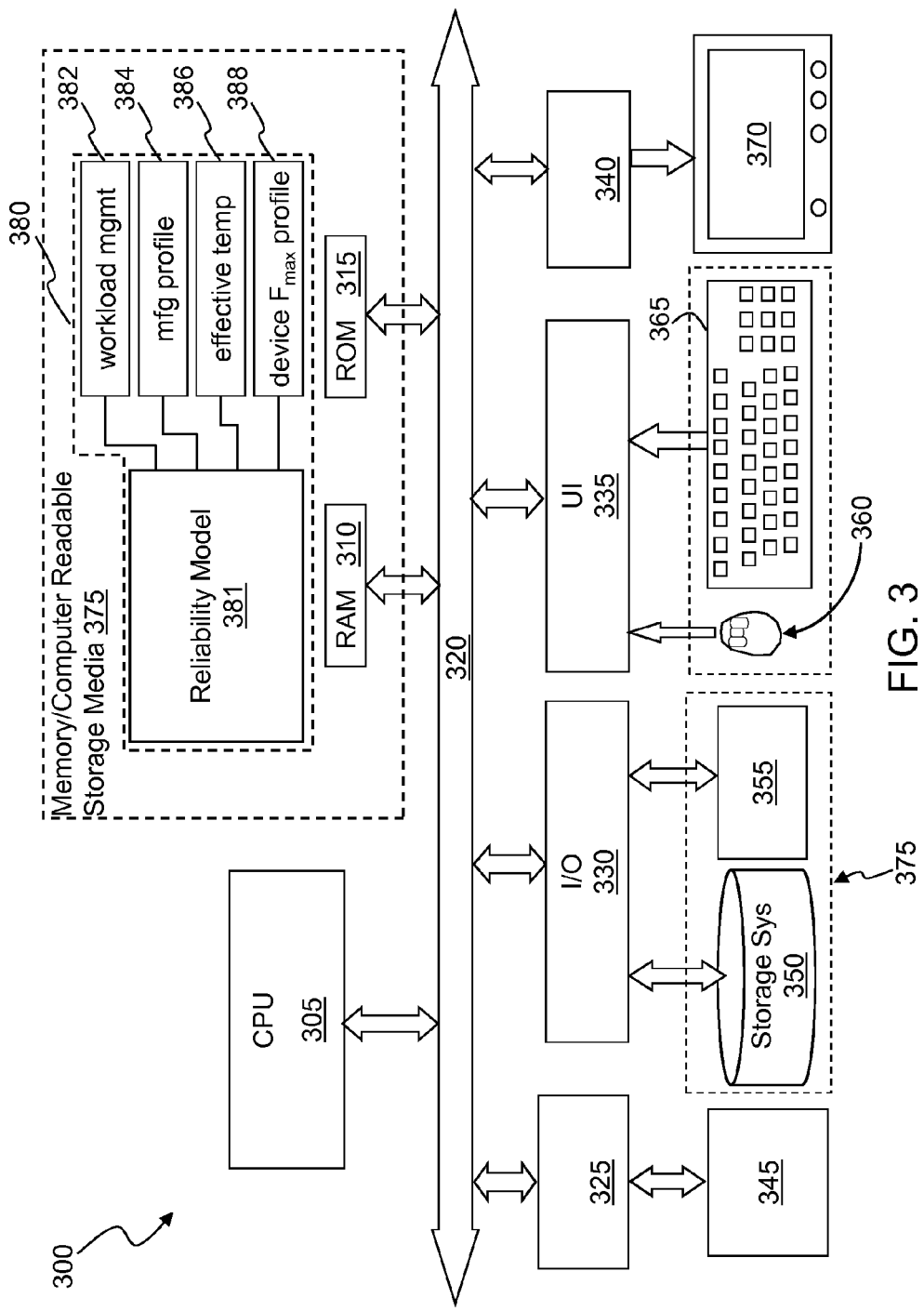
FIG. 3 is a schematic block diagram of a computer system and/or computing device and/or computing system and/or computing environment with which a failure avoidance method and/or system according to embodiments of the invention disclosed herein can be used and/or implemented.

Turning now to FIG. 3, an example of a block diagram of a general-purpose computer system 300 which can be used to implement the method, system, circuit and/or circuit design structure described herein. The method, system, circuit and/or circuit design structure may be coded as a set of instructions on removable or hard media for use by general-purpose computer, and thus may, in embodiments, include a computer program product. FIG. 3 is also a schematic block diagram of a general-purpose computer for practicing the present invention. Computer system 300 can have at least one microprocessor or central processing unit (CPU) 305. CPU 305 can be interconnected via a system bus 320 to machine readable media 375, which can include, for example, a random access memory (RAM) 310, a read-only memory (ROM) 315, a removable and/or program storage device 355, and/or a mass data and/or program storage device 350. An input/output (I/O) adapter 330 can connect mass storage device 350 and removable storage device 355 to system bus 320. A user interface 335 can connect a keyboard 365 and/or a mouse 360 and/or and other suitable input device to system bus 320, and a port adapter 325 can connect a data port 345 to system bus 320 and a display adapter 340 can connect a display device 370. ROM 315 can include the basic operating system for computer system 300. Examples of removable data and/or program storage device 355 include magnetic media such as floppy drives, tape drives, portable flash drives, zip drives, and optical media such as CD ROM or DVD drives. Examples of mass data and/or program storage device 350 include hard disk drives and non-volatile memory such as flash memory. In addition to keyboard 365 and mouse 360, other user input devices such as trackballs, writing tablets, pressure pads, microphones, light pens and position-sensing screen displays may be connected to user interface 335. Examples of display device 370 include cathode-ray tubes (CRT), liquid crystal diode (LCD) displays, light emitting diode (LED) displays, plasma displays, holographic displays, tactile displays, and/or any other display device as may be available, suitable, and/or known now and/or in the future.

A machine readable computer program may be created by one of skill in the art and stored in computer system 300 or a data and/or any one or more of machine readable medium 375 to simplify the practicing of this invention. In operation, information for the computer program created to run the present invention can be loaded on the appropriate removable data and/or program storage device 355, fed through data port 345, and/or entered using keyboard 365. A user can control the program by manipulating functions performed by the computer program and providing other data inputs via any of the above mentioned data input means. Display device 370 can provide a means for the user to accurately control the computer program and perform the desired tasks described herein.

A computer program product 380 according to embodiments of the invention disclosed herein can include a reliability model 381, as well as a workload management module (workload mgmt.) 382, a manufacturing profile module (mfg profile) 384, an effective temperature determination module (effective temp) 386, and/or a device maximum failure determination module (device $F_{max}$ profile) 388. It should be noted that one or all of modules 382-388 can include computer program code and/or data, such as look-up tables that can be used in place of computation based on formulae. Reliability model 381 can thus access modules 382-388 to practice a method according to embodiments, as will be described in more detail below. While shown as outside of RAM 310 and ROM 315, it should be readily apparent that computer program product 380 and/or portions thereof can reside in these and/or any other storage medium accessible by computer system 300. It should be noted that CPU(s) 305 can in embodiments be called a computing device(s), but that computer system 300 as a whole, or portions thereof, could also be called a computing device.

Figure 4:
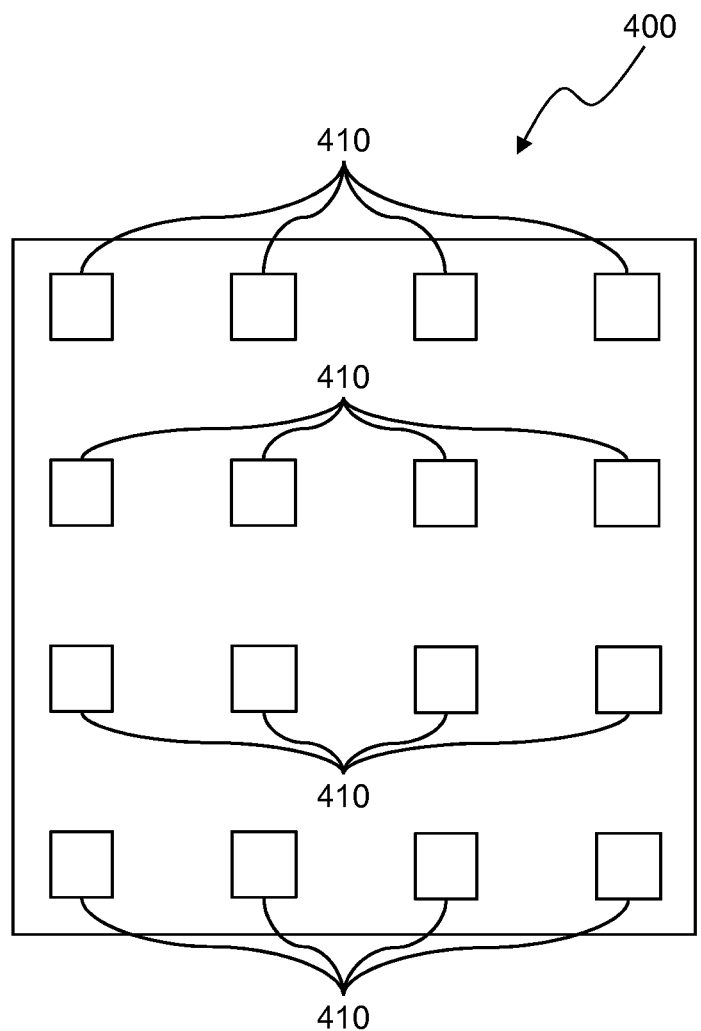
FIG. 4 is a schematic illustration of a device with which a failure avoidance method and/or system according to embodiments of the invention disclosed herein can be used.

FIG. 4 shows a schematic representation of a device 400 with which embodiments may be employed. As shown, such a device can include at least one sensor 410, such as a temperature sensor, a voltage sensor, an accelerometer, and/or any other suitable sensor and/or sensing device as may be desired, appropriate, and/or available now and/or in the future. For example, many semiconductor devices currently constructed include temperature sensors to monitor particular components and/or other devices that are part of the semiconductor device. In addition, as shown, a device 400 can include a plurality of sensors distributed substantially uniformly across device 400 to enable a profile of a sensed parameter of device 400 to be more easily determined. Examples of parameters, such as operating parameters and/or electrical parameters, that may be sensed and/or tracked and/or monitored include, but are not limited to, temperature, voltage, power, stress, strain, speed, acceleration, and/or vibration. Each sensor 410 can be connected to a computer system, such as computer system 300 of FIG. 3, such that computer system 300 and/or any program running thereon and/or any component and/or device therein can access information provided by any sensor 410. For example, computer program product 380 in embodiments can access information provided by such sensors, information gleaned therefrom being usable in operation of computer program product 380.

Figure 5:
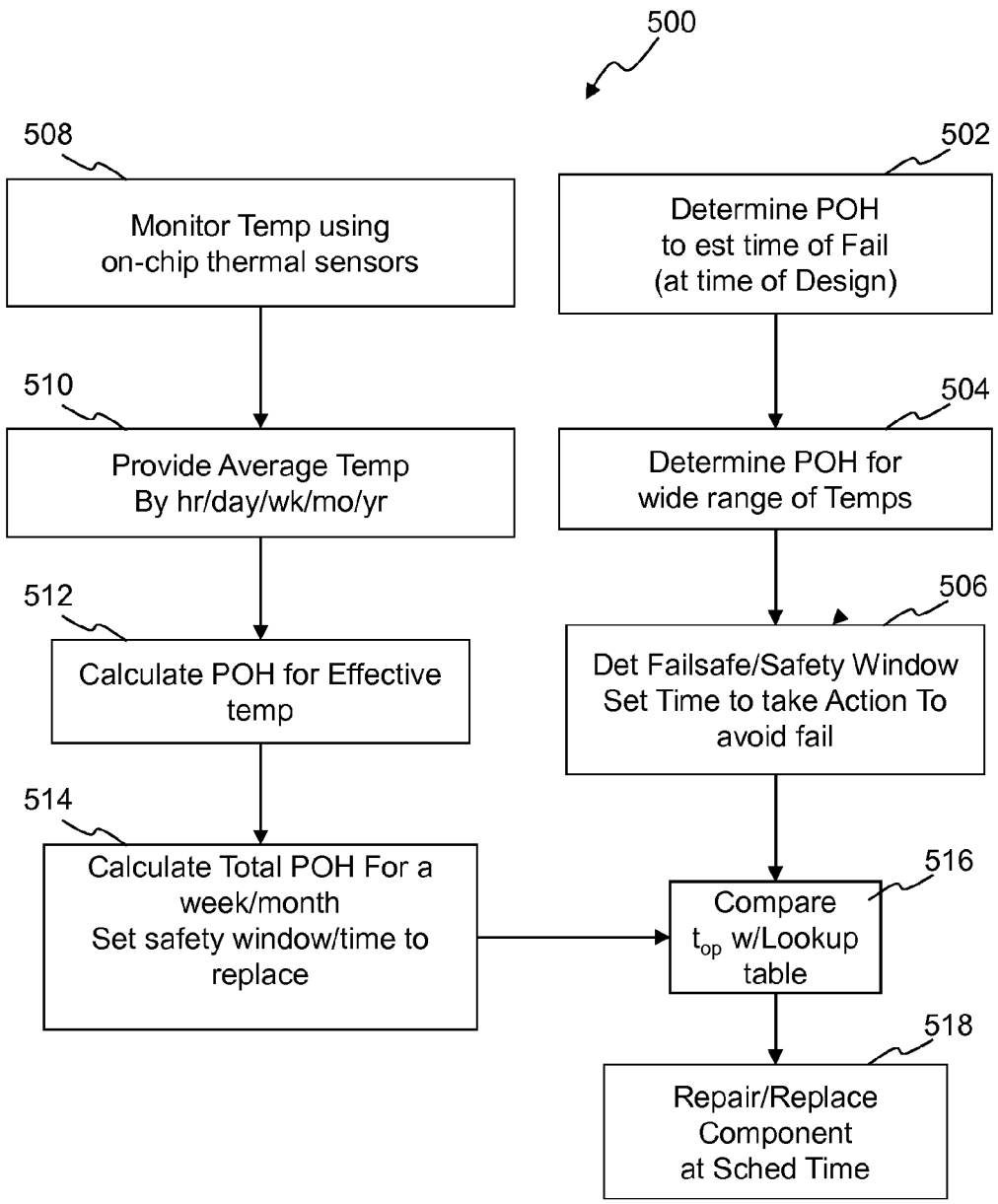
FIG. 5 is a schematic flow diagram of a failure avoidance method and/or system according to embodiments of the invention disclosed herein.

With reference to FIG. 5, an in-situ computing system device failure avoidance method 500 for a computing system according to embodiments can include determining a time to fail of a device (block 502), such as by determining a number of power on hours (POH) based on design and/or nominal operating temperature at a time of device manufacture. In embodiments, a plurality of times to fail can be determined based on a plurality of operating temperatures (block 504), and a failsafe or safety window can be applied (block 506) to each time to fail to create a respective time to replace, such as part of a look-up table of temperature vs. time to replace and/or vs. time to fail. At least one temperature can be monitored (block 508), such as by using on-device sensors, and an average temperature can be determined (block 510) over a tracking interval and/or per hour and/or per day and/or per week and/or per month and/or per year. A tracking interval need not be fixed in embodiments. In other words, a first tracking interval and a second tracking interval need not be identical in embodiments. The average temperature can then be used to determine an effective operating time and/or effective operating temperature (block 512), which can then be used to determine a time to replace (block 514), such as based on an effective operation time per a given real period. For example, a number of effective POH can be determined based on typical usage in a given period, such as a week or a month or other period, using effective operating temperature and/or effective operating time. A comparison between the time to replace determined based on effective temperature and/or operating time can be compared to the lookup table (block 516), and repair and/or replacement of a component can be scheduled, if necessary (block 518).

It should be understood that embodiments can perform blocks 502-506 for a device prior to its manufacture, prior to its sale, prior to its installation, and/or prior to its operation, and/or can be performed as part of a design process and/or by another machine. In such embodiments, some or all of the information obtained in blocks 502-506 can be stored in the device to be monitored or in a fashion accessible to the device and/or another system configured to monitor the device, such as in memory 375 of computer system 300. In other embodiments, blocks 502-506 can be performed during operation of the monitoring system, such as based on data stored in a memory or otherwise accessible. For example, a computer system or computing system 300 (FIG. 3) could access such information stored on storage medium/device 375 and/or such information could be entered via an input/output device and/or such information could be obtained via a network connection or the like. In addition, blocks 502-506 and blocks 508-512 can be performed substantially simultaneously in embodiments, though any suitable order could be employed.

Figure 6:
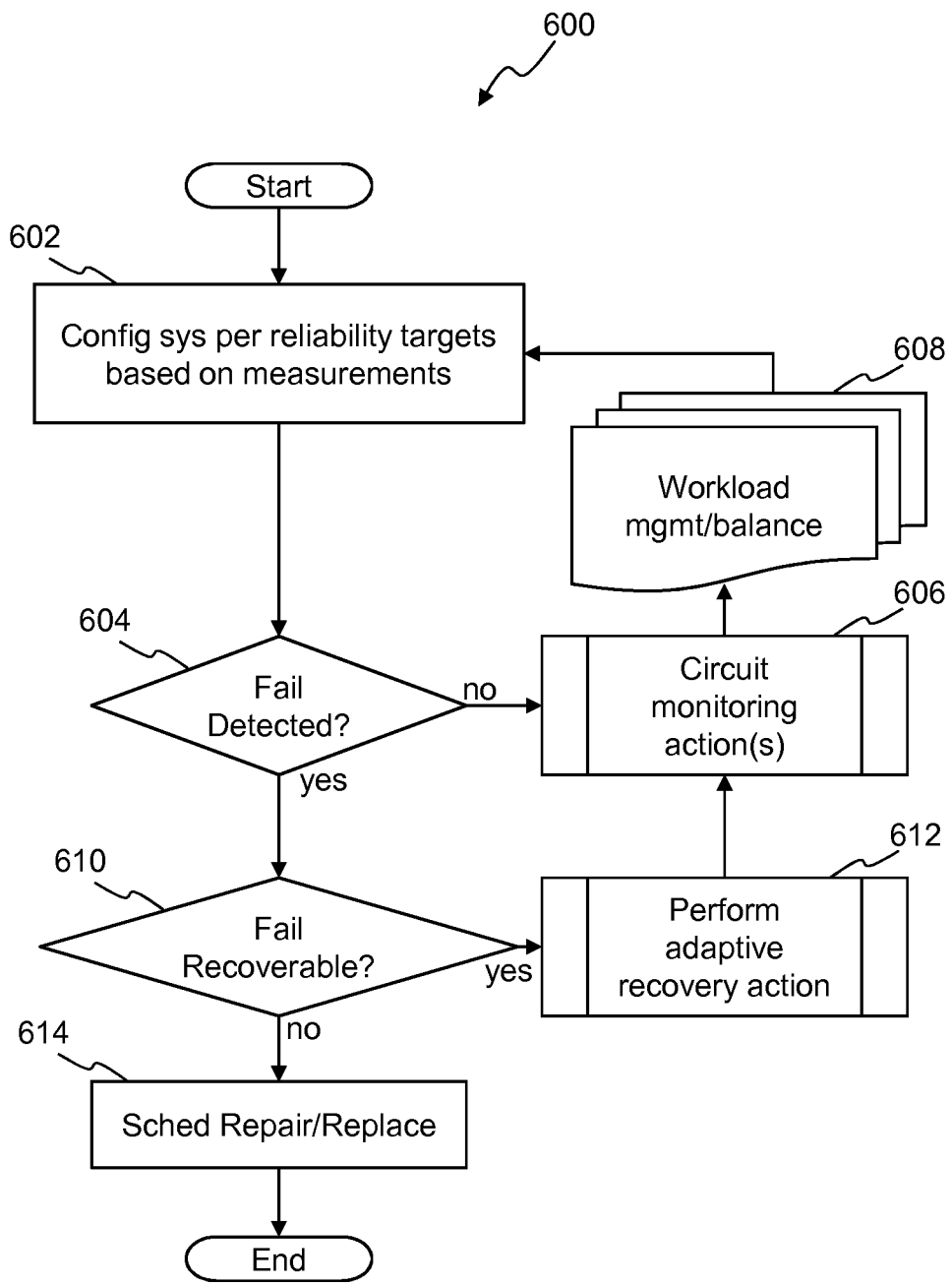
FIG. 6 is a schematic flow diagram of a failure avoidance method and/or system according to embodiments of the invention disclosed herein.

In another embodiment, an in-situ failure avoidance method 600, shown in FIG. 6, can include configuring a computing or computer system using targets determined from measurements and/or using a reliability model (block 602), such as reliability model 381 of FIG. 3. If a failure is not detected, monitoring can continue (block 606), workload can be managed and/or balanced (block 608), and operation can repeat from block 602. If a failure is detected (block 604), a determination as to whether the fail is recoverable can be made (block 610). If the fail is recoverable, then a recovery action and/or process and/or routine can be performed (block 612), monitoring can resume (block 606), workload can be managed and/or adjusted (block 608), and operation can repeat from block 602. If the fail is not recoverable (block 610), then this can be indicated and/or a user can be notified ad/or a repair and/or replacement can be requested and/or scheduled (block 614).

Figure 7:
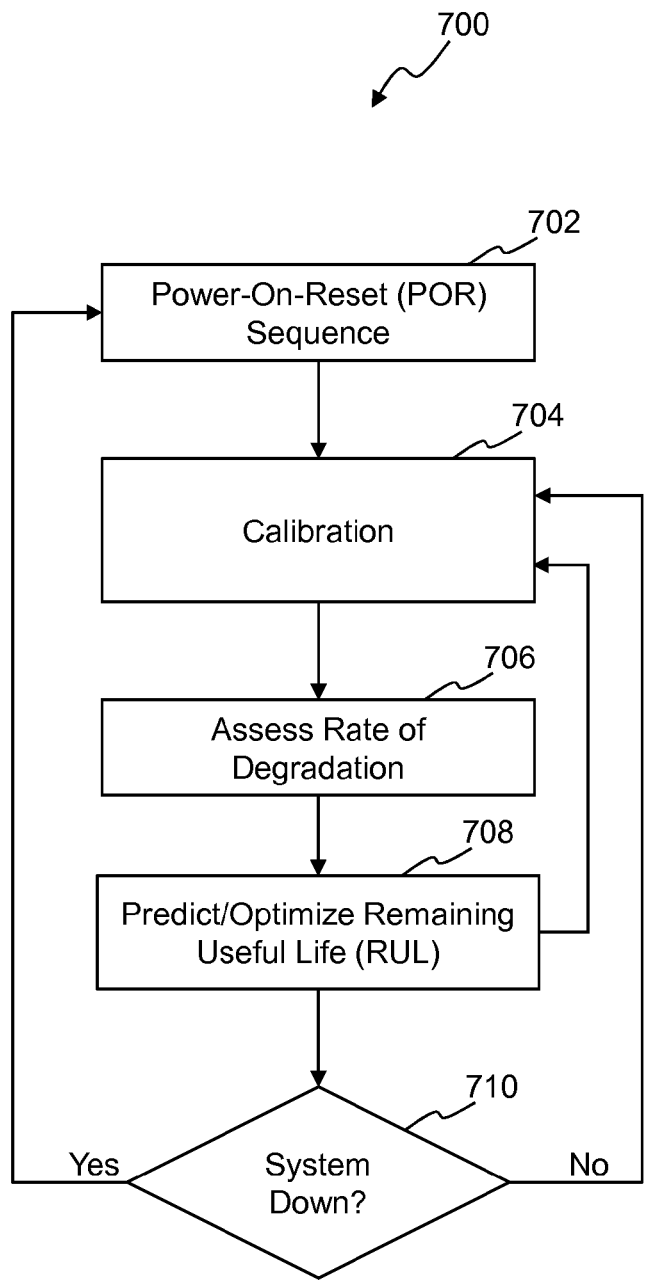
FIG. 7 is a schematic flow diagram of a failure avoidance method and/or system according to embodiments of the invention disclosed herein.

In another embodiment, a recovery action and/or routine and/or process and/or method 700 seen in FIG. 7 can include initiating a power on reset (POR) sequence (block 702) and calibrating the monitored device (block 704). A rate of degradation of the monitored device can be assessed (block 706), and a remaining useful life or remaining time to replace can be determined and/or predicted and/or estimated and/or optimized (block 708). A determination can be made as to whether the monitored system is down (block 710). If so, operation can repeat from POR sequence block 702. If not, operation can repeat from calibration block 704.

Figure 8:
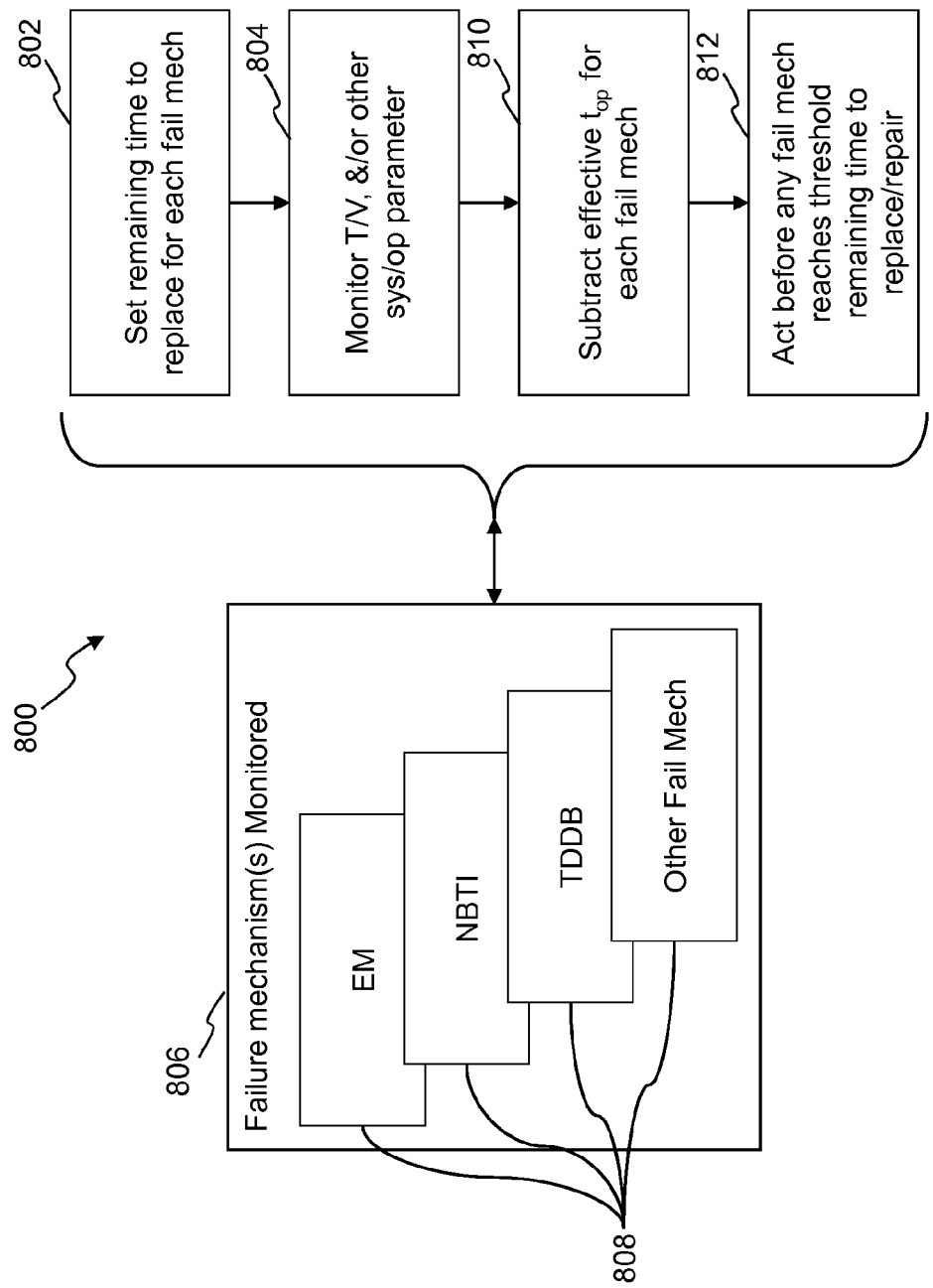
FIG. 8 is a schematic flow diagram of a failure avoidance method and/or system according to embodiments of the invention disclosed herein.

An in-situ failure avoidance method and/or system 800 according to embodiments, as suggested above and as seen schematically in FIG. 8, can assign a respective remaining time to replace initially equal to the respective time to replace (block 802) as might be determined at a time of manufacture of the device. The remaining time to replace can act as a budgeted lifetime of the device from which operating time can be subtracted to track how much operating time remains before a monitored device should be replaced. For example, in embodiments, at least one operating parameter of each device can be tracked and/or monitored (block 804), which can include measuring an operating parameter of the device at least once for each device during a tracking interval, such as by using an on-board sensor 410 of a device 400. Examples of a suitable operating parameter include any parameter whose time-variation can affect a rate of degradation of the device via at least one failure mechanism of the device, such as temperature, voltage, power, current, current density, and/or any other suitable operating parameter. Monitoring of such parameters can enable monitoring of at least one failure mechanism (block 806), examples 808 of which can include, but are not limited to, electromigration, time-dependent dielectric breakdown, corrosion, stress migration, hot carrier injection, negative bias temperature instability, fatigue and/or interfacial failure due to temperature cycling and/or thermal shock, intermetallic and/or oxidation failure, and/or any other failure mechanism as may be suitable and/or desired. Tracking an operating parameter can include measuring the parameter at the end of each tracking interval and/or at points during the tracking interval, depending on the particular parameter and/or the particular implementation according to embodiments of the invention disclosed herein. Thus, a body of measured values of each tracked operating parameter can be developed and/or collected for each tracking interval. An effective operating time can be determined for each monitored failure mechanism and subtracted from the remaining time to fail (block 810). A determination can be made as to whether any remaining time to replace has crossed a threshold (block 812) such that the device should be repaired and/or replaced.

Figure 9:
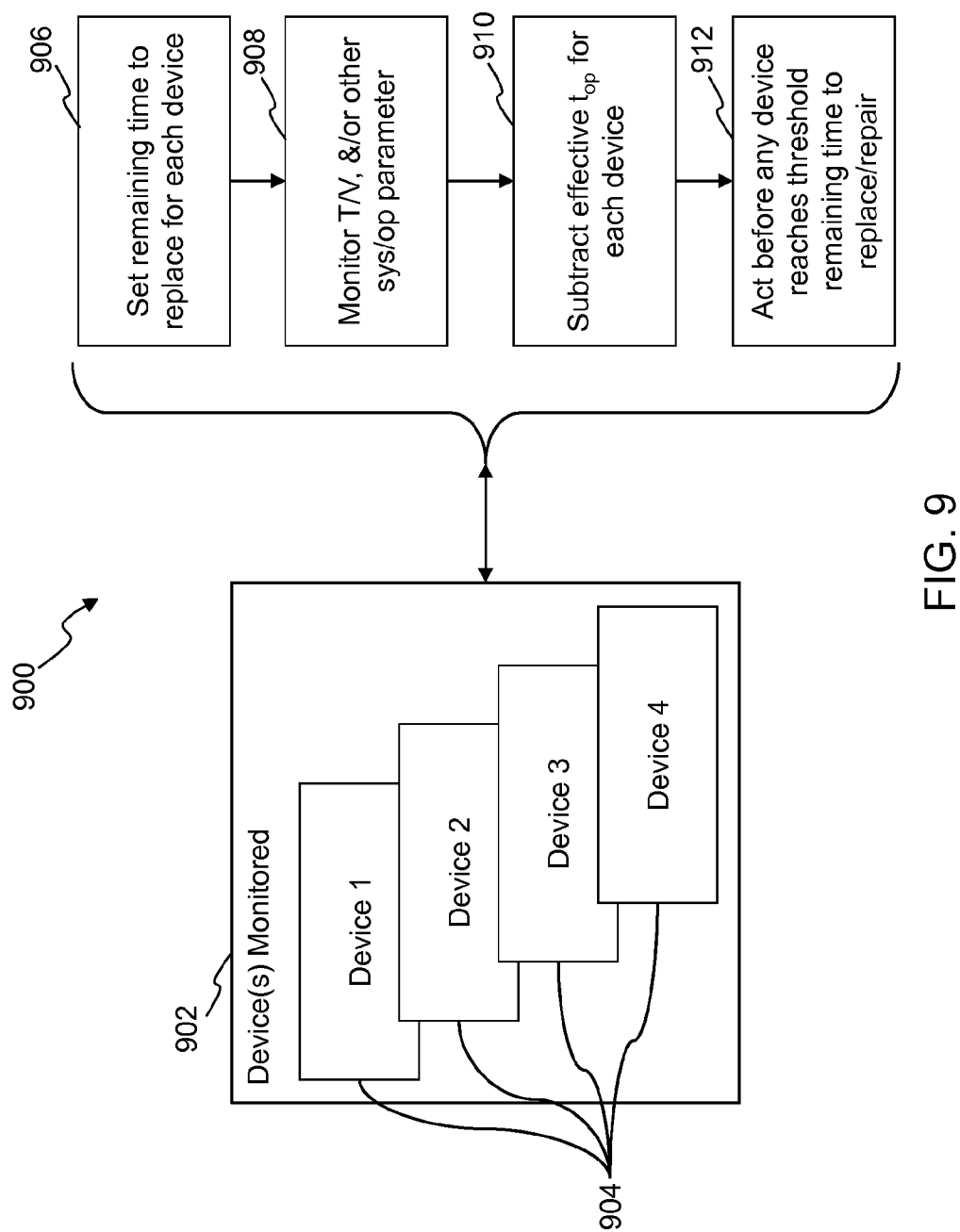
FIG. 9 is a schematic flow diagram of a failure avoidance method and/or system according to embodiments of the invention disclosed herein.

As suggested above, more than one device can be monitored and/or one or more devices can include monitored devices thereon and/or therein. This is schematically illustrated, for example, in FIG. 9. An in-situ failure avoidance method and/or system 900 can thus include determining which device(s) will be monitored (block 902), which can include a plurality of devices 904. A respective time to replace for each device of the at least one device 904 can be determined and/or assigned, and a remaining time to replace for each device can be set and/or assigned (block 906). Each time to replace can, for example, be a time determined at the time of design and/or manufacture of the respective device, such as might be based on expected loads at nominal or design operating temperature. As described above, time to place represents a time until a device should be replaced based on time in operation, usually expressed in power-on hours (POH), and is typically some predefined time before an estimated time to failure. For example, time to replace can be a percentage of time to failure, a fixed number of POH before estimated time to fail, and/or any other portion as may be suitable and/or appropriate.

Embodiments can monitor at least one operating parameter of one or more device 904 (block 908). To obtain the measured values, embodiments can use on-board and/or built-in sensors, including temperature sensors, voltage sensors, current sensors, timers and/or any other such sensors as may be deployed and/or included in any device of the computing system that embodiments can access and/or use and/or from which the computing system can otherwise receive a value related to a particular parameter for which the sensor is deployed. For example, as mentioned above, for a device 400 with which embodiments can be employed, on-board sensor(s) 410 can be accessed to obtain measured values. The measured parameter values can be used to determine a respective effective operation time for each device, which effective operation time can be subtracted from the respective remaining time to replace (block 910). As should be apparent, the effective operation time can be more or less time than has actually elapsed, depending on the particular operating conditions and/or circumstances. A determination can then be made as to whether any remaining time to replace has crossed a threshold value (block 912) such that a respective device 904 should be repaired and/or replaced.

In embodiments in which electromigration is a failure mechanism taken into account, a tracked operating parameter can include temperature T, and an effective operation temperature for a given interval $\Delta t$ can be determined using a relationship including $$T_{teff} = \left\{ \frac{1}{T_{des}} - \frac{\ln\left[\left(\frac{\Delta t_i}{t_{op}}\right)e^{\left[\frac{\Delta H}{k}\left(\frac{1}{T_{des}} - \frac{1}{T_i}\right)\right]}\right]}{\left(\frac{\Delta H}{k}\right)} \right\}^{-1}, \quad t_{op} = \sum_{i=1}^{\infty} \Delta t_i$$

where $T_{teff}$ is effective temperature in the time domain, $t_{op}$ is operation time of the device, $T_{des}$, is a design operating temperature, $T_i$ is a measured temperature at a respective tracking interval, $\Delta t_i$ is the respective tracking interval, $\Delta H$ is electromigration activation energy, and k is Boltzmann's constant. Thermal acceleration can vary as between different failure mechanisms, and the relationship above can be modified accordingly to accommodate different reliability failure mechanisms. Thus, while the description includes details about electromigration as a failure mechanism, it should be understood that embodiments of the invention disclosed herein can be applied to other failure mechanisms.

In addition, determining the respective time to replace can include determining a space domain effective temperature for each device. For example, a device such as device 400 of FIG. 4 can include multiple sensors 410, each of which can be monitoring one or more elements. Since it is likely that temperature will not be uniform across all of device 400, an effective temperature can be determined using the values provided by sensors 410, such as by using the relationship $$f(T_{seff}) = \sum_{i=1}^{M} \frac{n_i}{N} f(T_i),$$

where $f(T_i)$ is the failure probability per element at measured $T_i$, $T_{seff}$ is effective temperature in the space domain, N is a total number of elements contributing to the corresponding reliability failure mechanism (in this example, electromigration), M is the total number of temperature sensors used, $T_i$ is a temperature of a respective sensor, and $n_i$ is a number of elements tracked by a respective sensor.

Using one or both effective temperatures, an effective operation time can be determined, such as by using the relationship $$t_{op_{eff}} = \Delta t \cdot e^{\frac{\Delta H}{k}\left(\frac{1}{T_{des}} - \frac{1}{T_{seff}}\right)}$$

where $t_{op_{eff}}$ is effective operating time or time of operation, $T_{seff}$ is effective temperature in the space domain, M is the total number of temperature sensors used, $T_{des}$ is a design or nominal operating temperature of the device, and k is Boltzmann's constant, and $\Delta t_i$ is the actual elapsed time of operation. While particular examples of relationships that can be employed to determine effective temperature, effective operating time, and other factors used in embodiments, it should be apparent that any suitable relationship can be employed within the scope of embodiments.

Figure 10:
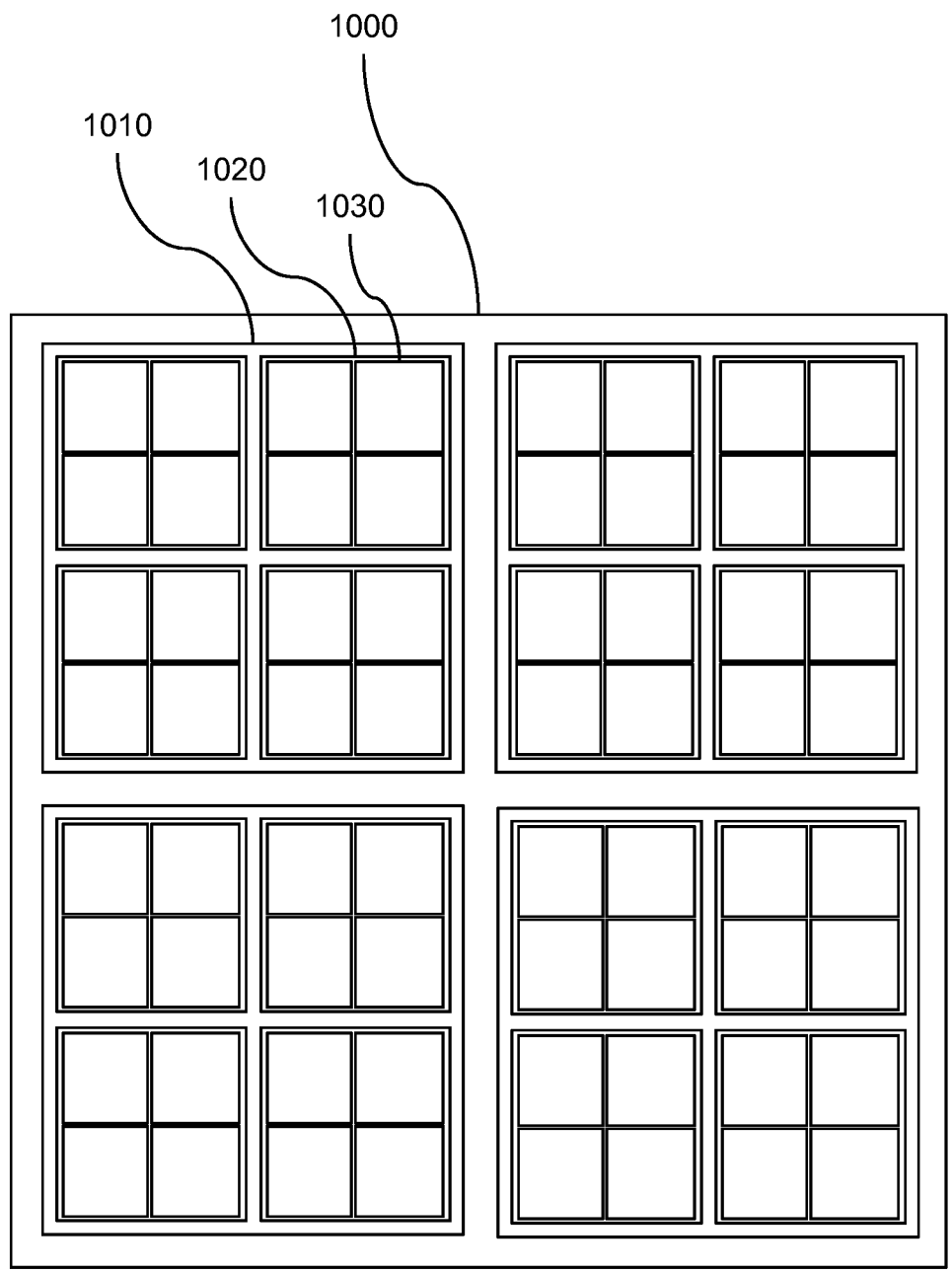
FIG. 10 is a schematic illustration of a device with which a failure avoidance method and/or system according to embodiments of the invention disclosed herein can be used.

As suggested above and as shown in FIG. 10, a device 1000 in computer system or computing system in which embodiments can be implemented can itself include more than one device 1010, which can each include multiple devices 1020, which can each include multiple devices 1030, and so forth. Embodiments can be implemented recursively or otherwise adapted to monitor any of such devices at any level of device 1000 as may be suitable and/or desired and/or practical in light of processing limitations and other factors. In each case, devices 1000, 1010, 1020, 1030, etc., can include one or more sensors, such as illustrated by sensors 410 of device 400 in FIG. 4. In keeping with the principles disclosed herein, embodiments can assign to each device a remaining time to replace, initially a time to replace assigned at time of design and/or manufacture, and one or more failure mechanisms can be monitored for each respective device. In embodiments, each device can be assigned a time to replace based a failure mechanism yielding the shortest time to replace, which can also be used as the time to replace for the device as a whole and/or a device of which it is part. Thus, if a core of a multiprocessor chip has a shorter time to replace than a cache memory of the chip, then the time to replace of the chip as a whole can be the time to replace of the core. Likewise, a time to replace of the computing system as a whole can be a shortest time to replace of a device the system includes, though in practice this would serve more as a flag indicating the system needs attention since component parts/devices can typically be replaced without replacing the entire system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A failure avoidance system and/or method according to embodiments of the invention disclosed herein may be implemented as a circuit design structure, such as might be implemented with the example of a computer system or computing system 300 described above. The design structure may be coded as a set of instructions on removable or hard media for use by general-purpose computer 300, and a machine readable computer program may be created by one of skill in the art and stored in computer system 300 or a data and/or any one or more of machine readable medium 375 to simplify the practicing of this invention as described above.

Figure 11:
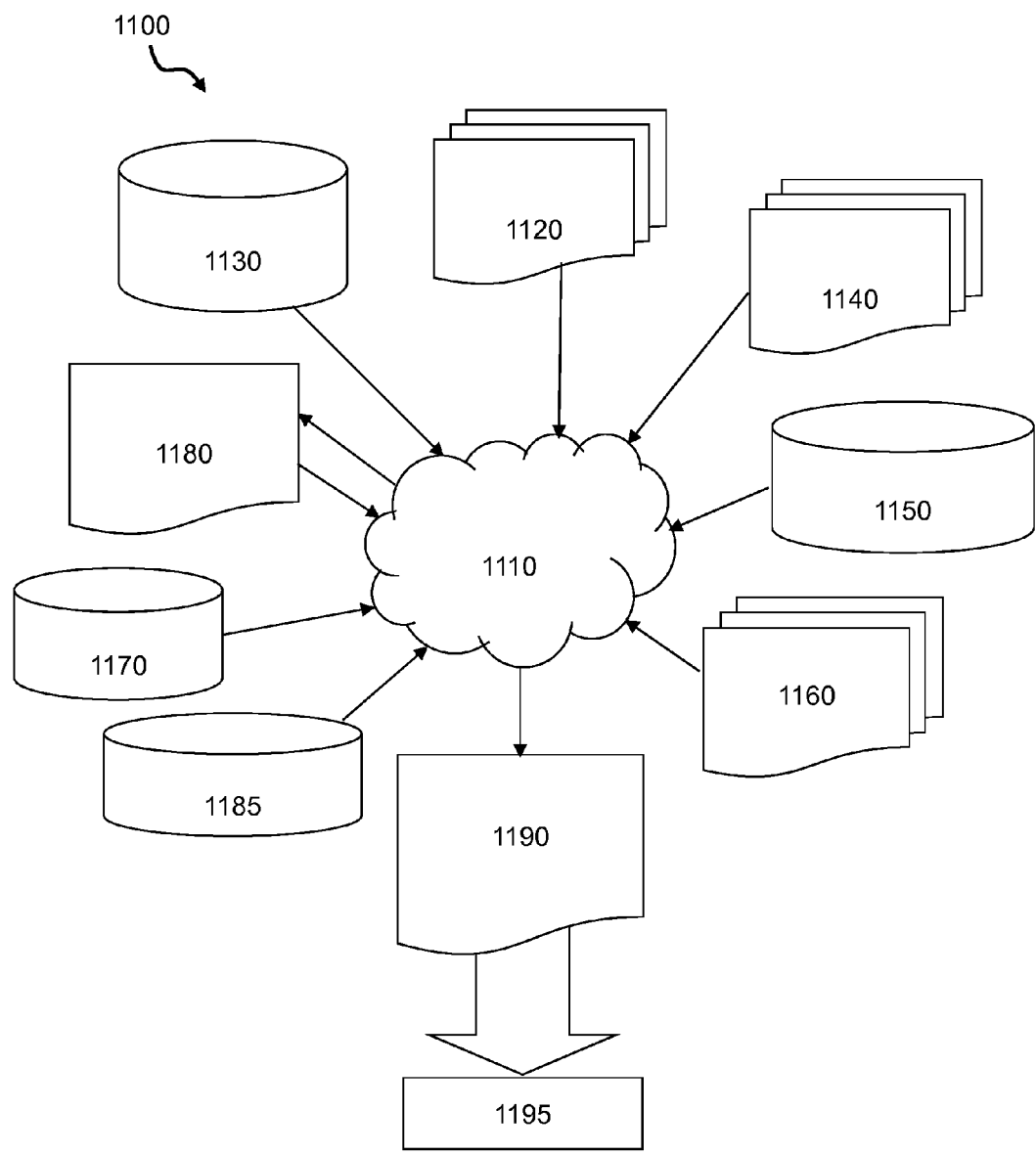
FIG. 11 is a schematic block diagram of a design environment and/or flow and/or process with which a failure avoidance method and/or system according to embodiments of the invention disclosed herein and/or a design structure implementing a failure avoidance method and/or system according to embodiments of the invention disclosed herein can be designed and/or manufactured.

FIG. 11 shows a block diagram of an example design flow 1100. Design flow 1100 may vary depending on the type of IC being designed. For example, a design flow 1100 for building an application specific IC (ASIC) may differ from a design flow 1100 for designing a standard component. Design structure 1120 is preferably an input to a design process 1110 and may come from an IP provider, a core developer, or other design company or may be generated by the operator of the design flow, or from other sources. Design structure 1120 can comprise failure avoidance system and/or method 500-900 in the form of schematics or HDL, a hardware-description language (e.g., Verilog, VHDL, C, etc.). Design structure 1120 may be contained on one or more machine readable medium. For example, design structure 1120 may be a text file or a graphical representation of Failure avoidance system and/or method 200. Design process 1110 preferably synthesizes (or translates) failure avoidance system and/or method 500-900 into a netlist 1180, where netlist 1180 is, for example, a list of wires, transistors, logic gates, control circuits, I/O, models, etc., that describes the connections to other elements and circuits in an integrated circuit design and recorded on at least one of machine readable medium. This may be an iterative process in which netlist 1180 is re-synthesized one or more times depending on design specifications and parameters for the circuit.

Design process 1110 may include using a variety of inputs; for example, inputs from library elements 1130 which may house a set of commonly used elements, circuits, and devices, including models, layouts, and symbolic representations, for a given manufacturing technology (e.g., different technology nodes, 32 nm, 45 nm, 120 nm, etc.), design specifications 1140, characterization data 1150, verification data 1160, design rules 1170, and test data files 1185 (which may include test patterns and other testing information). Design process 1110 may further include, for example, standard circuit design processes such as timing analysis, verification, design rule checking, place and route operations, etc. One of ordinary skill in the art of integrated circuit design can appreciate the extent of possible electronic design automation tools and applications used in design process 1110 without deviating from the scope and spirit of the invention. The design structure of the invention is not limited to any specific design flow.

Ultimately, design process 1110 preferably translates failure avoidance system and/or method 500-900, along with the rest of the integrated circuit design (if applicable), into a final design structure 1190 (e.g., information stored in a GDS storage medium). Final design structure 1190 may comprise information such as, for example, test data files, design content files, manufacturing data, layout parameters, wires, levels of metal, vias, shapes, test data, data for routing through the manufacturing line, and any other data required by a semiconductor manufacturer to produce failure avoidance system and/or method 500-900. Final design structure 1180 may then proceed to a stage 1185 where, for example, final design structure 1180 proceeds to tape-out, is released to manufacturing, is sent to another design house or is sent back to the customer.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computing system device failure avoidance method for a computing system including at least one device, the method comprising:
identifying at least one failure mechanism of each device affected by time variation of an operating parameter of the device;
assigning a respective time to replace for each failure mechanism;
assigning a respective remaining time to replace initially equal to the respective time to replace for each failure mechanism,
tracking the operating parameter periodically at a tracking interval;
tracking a respective remaining time to replace for each failure mechanism periodically at the tracking interval, including,
determining an effective operating time of the respective device during each tracking interval based on at least one value of the operating parameter tracked during a respective tracking interval, and
subtracting the effective operating time from the respective remaining time to replace; and
replacing a respective device responsive to one of the respective estimated time to replace reaching a respective threshold value.

2. The method of claim 1, wherein the identifying of at least one failure mechanism includes identifying a performance metric impacted by time variation of an operating parameter of the device and identifying at least one failure mechanism of the device based on the performance metric.

3. The method of claim 1, wherein the assigning of the respective time to replace and a respective remaining time to replace initially equal to the respective time to replace for each failure mechanism includes assigning a respective expected number of failures for each of the at least one failure mechanism and assigning a respective time to replace for each of the at least one failure mechanism based at least in part on a respective expected number of fails.

4. The method of claim 1, further comprising:
monitoring for a fail;
responsive to a fail, determining whether a failure is recoverable,
responsive to the failure being recoverable, performing a recovery action and returning to monitoring for a failure, tracking the operating parameter, and tracking the respective remaining time to replace,
responsive to the failure not being recoverable, notifying a user that action is necessary, and
responsive to a failure that is not recoverable, notifying a user of the failure.

5. The method of claim 1, wherein the at least one failure mechanism includes electromigration.

6. The method of claim 1, wherein the operating parameter is temperature and the tracking of the operating parameter includes using at least one device temperature sensor to measure a respective temperature during a measurement period at each tracking interval.

7. The method of claim 6, further comprising determining a space domain estimated failure rate based on at least a number of temperature sensors used and the respective measured temperatures for each sensor and at each tracking interval.

8. The method of claim 7, wherein each of the at least one temperature sensor tracks a respective number of elements, and the space domain estimated failure rate employs the relationship:

$$f(T_{seff}) = \sum_{i=1}^{M} \frac{n_i}{N} f(T_i),$$

where $T_{seff}$ is effective temperature in the space domain, N is a total number of tracked elements, M is the total number of temperature sensors used, $T_i$ is a temperature of a respective sensor, and $n_i$ is a number of elements tracked by a respective sensor.

9. The method of claim 6, further comprising determining a time domain estimated failure rate based on at least design life of the device, a respective measured temperature for each tracking interval, an operation time of the device, and a relationship between operation time, measured temperature, and tracking interval.

10. The method of claim 9, wherein each of the at least one temperature sensor tracks a respective number of elements, the failure mechanism is electromigration, and the relationship includes:

$$f(T_{\mathit{eff}}) = \left\{ \frac{\frac{1}{T_{des}} - \ln\left[\sum \left(\frac{\Delta t_i}{t_{op}}\right) e^{\left[\frac{\Delta H}{k}\left(\frac{1}{\Delta T_{des}} - \frac{1}{T_i}\right)\right]}\right]}{\left(\frac{\Delta H}{k}\right)} \right\}^{-1}, \ t_{op} = \sum_{i=1}^{\infty} \Delta t_i,$$

where $T_{teff}$ is effective temperature in the time domain, $t_{op}$ is the operation time of the device, $T_{des}$, is the design operating temperature, $T_i$ is a measured temperature at a respective time interval, $\Delta t_i$ is the respective tracking time interval, $\Delta H$ is electromigration activation energy, k is Boltzmann's constant, and $n_i$ is a number of elements tracked by a respective sensor.

11. The method of claim 1, wherein a respective remaining time to replace for each of the at least one device is based on smallest remaining time to replace of the respective at least one failure mechanism of the respective at least one device.

12. An in-situ computing system device failure avoidance method for a computing system including at least one device, the method comprising:
assigning a respective time to replace for each device of the at least one device;
assigning a respective remaining time to replace initially equal to the respective time to replace;
tracking at least one operating parameter of each device, including measuring an operating parameter of the device at least once for each device during a tracking interval;
determining a respective effective operation time for each device based on a respective measured value of the operating parameter and the tracking interval;
subtracting the respective effective operation time from the respective remaining time to replace;
monitoring for a failure of the at least one device;
responsive to a failure of the at least one device, maintaining the respective device and continuing operation in response to the failure being recoverable, and notifying a user in response to the failure not being recoverable; and
responsive to a respective remaining time to replace having reached a threshold value, replacing the respective device.

13. The method of claim 12, wherein the determining of the respective time to replace includes identifying at least one respective failure mechanism of the device and determining a respective time to replace for each failure mechanism, and the determining of the respective remaining time to replace for each device includes determining a respective effective operation time based on at least one measured value of the operating parameter at a respective interval, and subtracting the respective effective operation time from the respective remaining time to replace.

14. The method of claim 13, wherein the operating parameter is temperature, the failure mechanism is electromigration, each device includes at least one temperature sensor each tracking a number of elements, and the determining of the respective time to replace includes determining a time domain estimated failure rate for each device using the relationship:

$$f(T_{\textit{eff}}) = \left\{ \frac{\frac{1}{T_{des}} - \ln\left[\sum \left(\frac{\Delta t_i}{t_{op}}\right) e^{\left[\frac{\Delta H}{k}\left(\frac{1}{T_{des}} - \frac{1}{T_i}\right)\right]}\right]}{\left(\frac{\Delta H}{k}\right)} \right\}^{-1}, \; t_{op} = \sum_{i=1}^{\infty} \Delta t_i,$$

where $T_{\textit{teff}}$ is effective temperature in the time domain, $t_{op}$ is operation time of the device, $T_{des}$, is a design operating temperature, $T_i$ is a measured temperature at a respective tracking interval, $\Delta t_i$ is the respective tracking interval, $\Delta H$ is electromigration activation energy, k is Boltzmann's constant, and $n_i$ is a number of elements tracked by a respective sensor.

15. The method of claim 12, wherein the operating parameter is temperature, each device includes at least one temperature sensor each tracking a number of elements, and the determining of the respective time to replace includes determining a space domain estimated failure rate for each device using the relationship:

$$f(T_{\textit{seff}}) = \sum_{i=1}^{M} \frac{n_i}{N} f(T_i),$$

where $T_{\textit{seff}}$ is effective temperature in the space domain, N is a total number of tracked elements, M is the total number of temperature sensors used, $T_i$ is a temperature of a respective sensor, and $n_i$ is a number of elements tracked by a respective sensor.

16. A computing system failure avoidance computer program product for a computing system including at least one device and at least one processing unit in communication with at least one non-transitory computer readable storage medium, the computer program product being stored on the at least one non-transitory computer readable storage medium and including instructions in the form of computer executable code that when loaded and executed by the processing unit cause the processing unit to perform a method comprising:
 identifying at least one failure mechanism of each of the at least one device affected by time variation of an operating parameter of the respective device;
 assigning a respective time to replace for each failure mechanism;
 assigning a respective remaining time to replace for each failure mechanism initially equal to the respective time to replace,
 tracking the operating parameter periodically at a tracking interval;
 tracking the respective remaining time to replace for each failure mechanism, including,
  determining an effective operating time of each device during each tracking interval based on at least one value of the operating parameter tracked during a respective tracking interval, and
  subtracting the effective operating time from the respective remaining time to replace; and
 replacing a respective device in response to one of the respective remaining time to replace reaching a respective threshold value.

17. The computer program product of claim 16, wherein the method further comprises monitoring for a failure,
 responsive to a failure, determining whether the failure is recoverable,
 responsive to the failure being recoverable, performing a recovery action and returning to monitoring for a failure, and
 responsive to the failure not being recoverable, notifying a user of the failure.

18. The computer program product of claim 16, wherein the operating parameter is temperature, the tracking of the operating parameter includes using at least one temperature sensor of the computing system to measure a respective temperature of each device during each tracking interval, each of the at least one sensor tracks a respective number of elements, and the determining of the time to replace includes determining a space domain estimated failure rate based on at least a number of temperature sensors used and the respective measured temperatures for each sensor and at each tracking interval using the relationship:

$$f(T_{\textit{seff}}) = \sum_{i=1}^{M} \frac{n_i}{N} f(T_i),$$

where $T_{\textit{seff}}$ is effective temperature in the space domain, N is a total number of tracked elements, M is the total number of temperature sensors used, $T_i$ is a temperature of a respective sensor, and $n_i$ is a number of elements tracked by a respective sensor.

19. The computer program product of claim 16, wherein the operating parameter is temperature, the tracking of the operating parameter includes using at least one temperature sensor of the computing system to measure a respective temperature of each device during each tracking interval, each of the at least one sensor tracks a respective number of elements, the at least one failure mechanism includes electromigration, and the determining of the time to replace includes determining a time domain estimated failure rate based on at least design life of the device, the respective measured temperature for each tracking interval, and an operation time of the device using the relationship:

$$f(T_{\textit{eff}}) = \left\{ \frac{\frac{1}{T_{des}} - \ln\left[\sum \left(\frac{\Delta t_i}{t_{op}}\right) e^{\left[\frac{\Delta H}{k}\left(\frac{1}{T_{des}} - \frac{1}{T_i}\right)\right]}\right]}{\left(\frac{\Delta H}{k}\right)} \right\}^{-1}, \; t_{op} = \sum_{i=1}^{\infty} \Delta t_i,$$

where $T_{\textit{teff}}$ is effective temperature in the time domain, $t_{op}$ is the operation time of the device, $T_{des}$, is the design operating temperature, $T_i$ is a measured temperature at a respective time interval, $\Delta t_i$ is the respective tracking time interval, $\Delta H$ is electromigration activation energy, k is Boltzmann's constant, and $n_i$ is a number of elements tracked by a respective sensor.

20. The computer program product of claim 16, wherein the computing system includes at least one component, the method is applied recursively to each component, and a respective time to replace is tracked for each component and triggers replacing one of the device or the component when the respective time to replace has reached a respective threshold value.

* * * * *